United States Patent [19]
Séguin

[11] Patent Number: 5,695,596
[45] Date of Patent: Dec. 9, 1997

[54] APPARATUS FOR LAYING UP VENEER PANELS

[76] Inventor: Jacques Séguin, 1041, chemin La Baie, Rigaud, Québec, Canada, J0P 1P0

[21] Appl. No.: 668,617

[22] Filed: May 7, 1996

[51] Int. Cl.$^6$ .................................................. B32B 31/00
[52] U.S. Cl. ...................... 156/538; 156/557; 156/559; 156/563; 198/811; 414/758
[58] Field of Search .................................. 156/538, 556, 156/557, 559, 563, 566; 198/402, 689.1, 811; 414/758, 781, 782

[56] References Cited

U.S. PATENT DOCUMENTS

| 3,891,414 | 6/1975 | Lamberet | 156/563 X |
| 4,931,131 | 6/1990 | Thompson | 156/563 X |

*Primary Examiner*—James Engel

[57] ABSTRACT

Apparatus for automatically laying up veneer sheets for the manufacture of continuous veneer panels composed of a plurality of stacked sheets, optionally glued on their top face. The apparatus includes a frame, a conveyor for receiving the veneer sheets transversely and for successively feeding said veneer sheets in a timed manner into the apparatus, the conveyor having an alignment device for aligning the sheets and having lug members for pushing against the back transverse edge of each of said sheets, thereby urging said sheets forward. The conveyor running on a track having a upward trajectory portion and an inverted trajectory portion so that the sheets are gradually flipped top face down. The sheets are maintained against the conveyor by vacuum hoods mounted behind and between the conveyor. When reaching their inverted position, the sheets transfer onto a suction box having suction feet substantially straddling the inverted portion of the conveyor. The suction box is connected to a vacuum source and is movable up and down by an controllable stroke for sequentially depositing veneer sheets, stacking them in a predetermined order on a discharge conveyor.

11 Claims, 7 Drawing Sheets

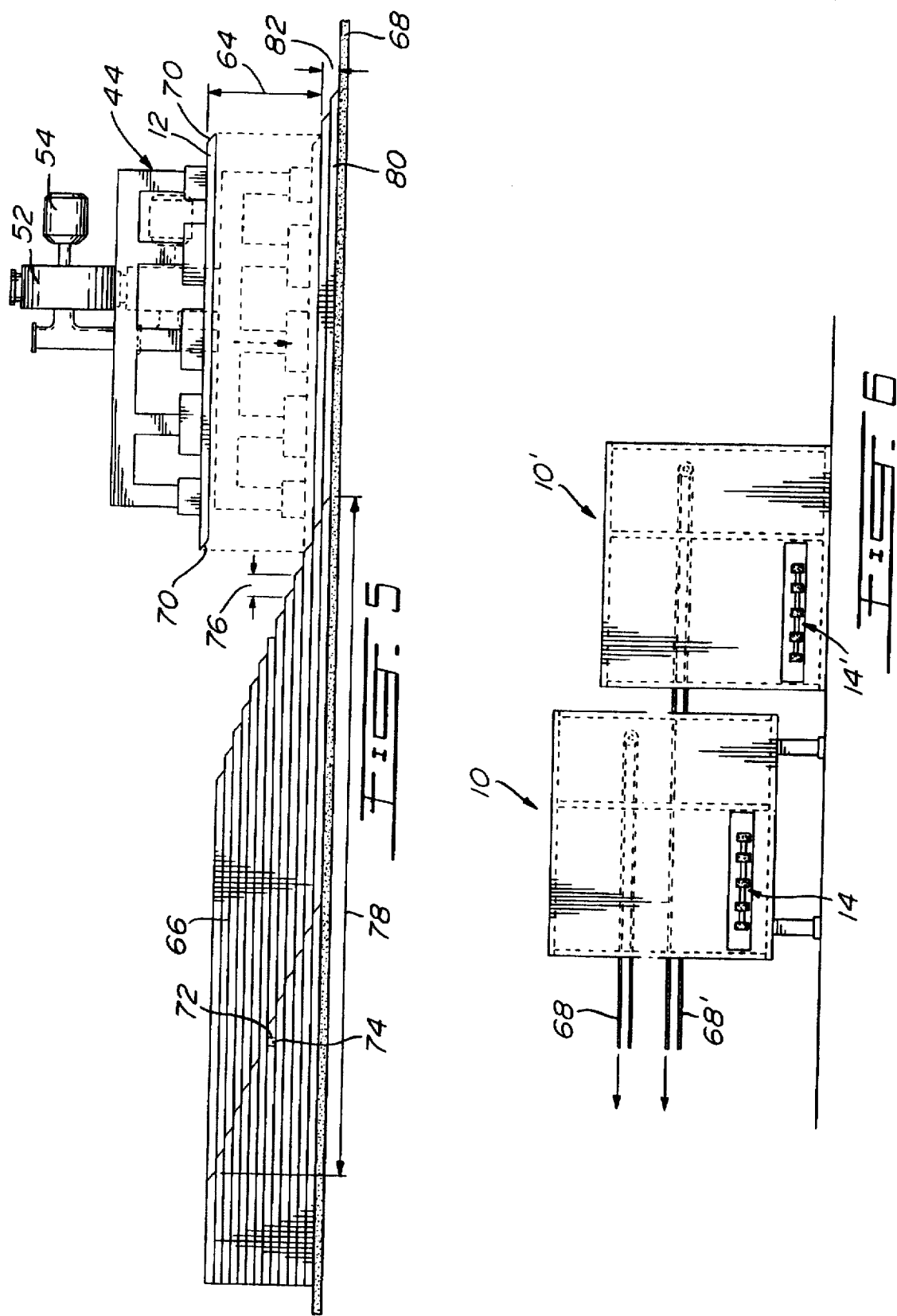

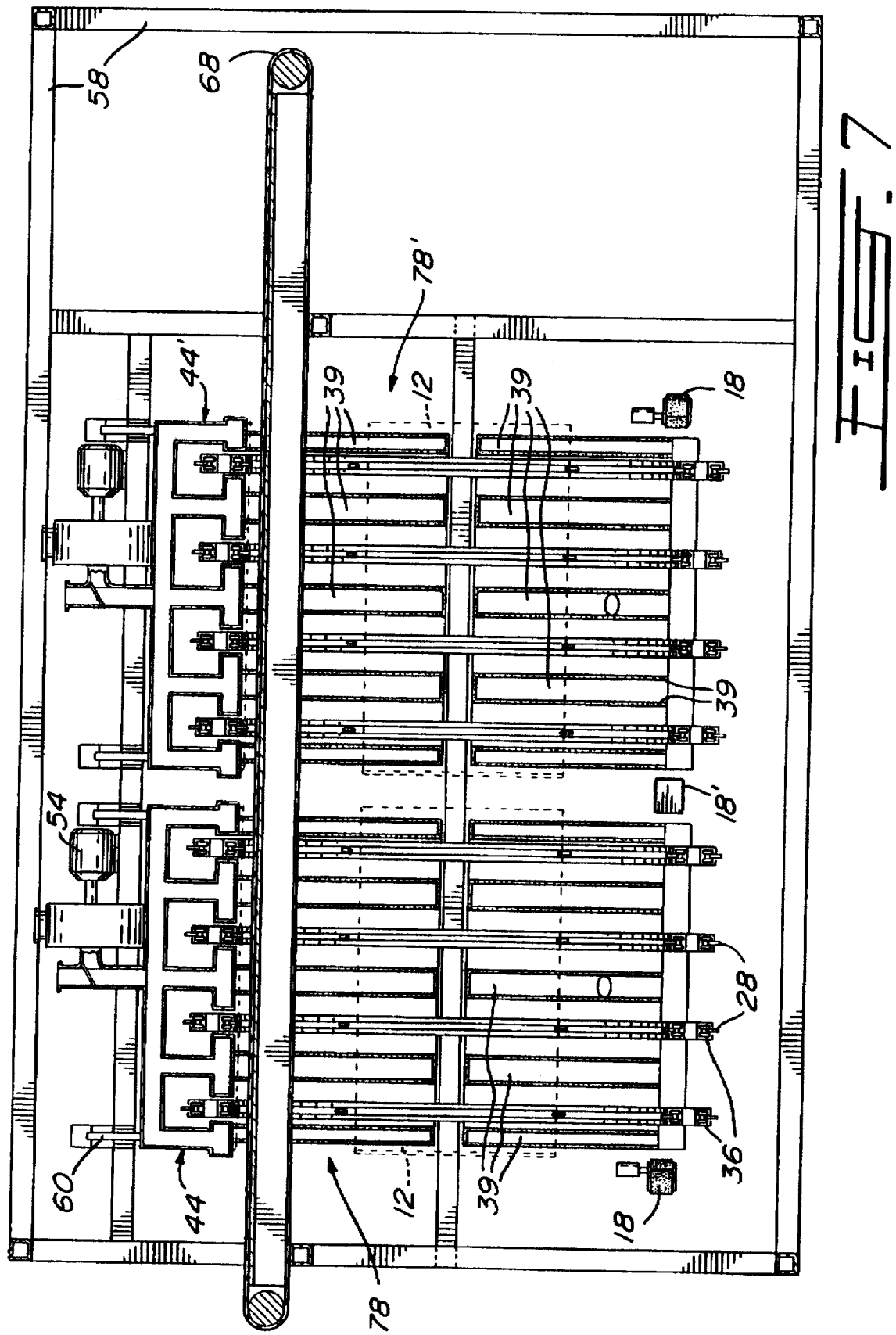

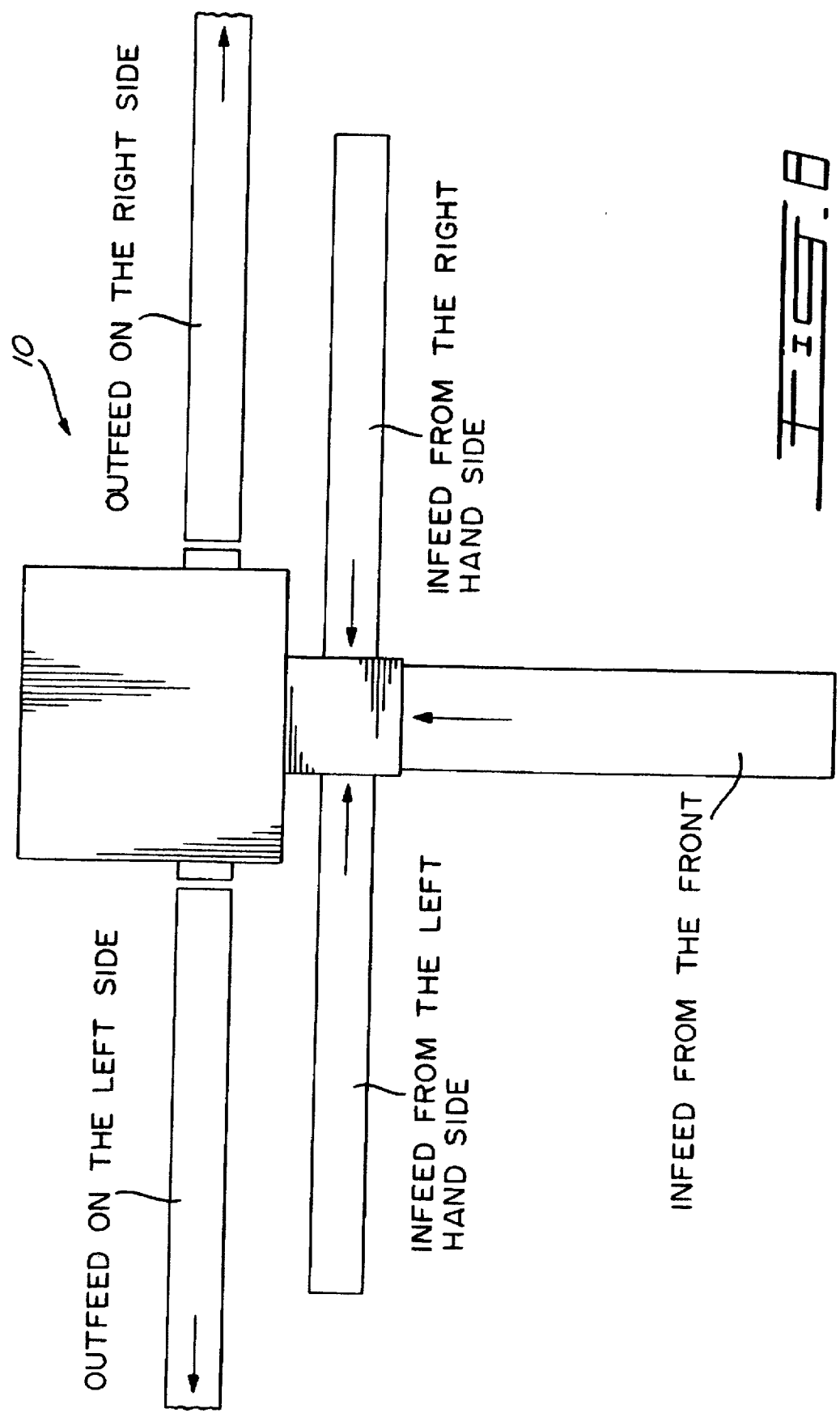

APPARATUS FOR LAYING UP VENEER PANELS

FIELD OF THE INVENTION

This invention relates to apparatus for laying up presized veneer sheets used in the manufacture of so-called continuous veneer panels. Continuous veneer panels are made of multiple lengths and layers of veneer sheets, glued and pressed together in a monolithic panel.

The present invention also relates to apparatus for making plywood panels by laying up presized veneer sheets glued and pressed together to form plywood panels.

Generally speaking, continuous veneer panels and plywood panels are made by laying up presized and preglued veneer sheets in a predetermined order, followed by pressing the assembled panels in a veneer press optionally accompanied by heating to hasten curing of the glue. The finished panels are then trimmed to exact sizes prior to shipment.

DESCRIPTION OF THE PRIOR ART

It is known, for example from U.S. Pat. Nos. 3,616,090, and 4,466,856, to lay up veneer sheets for the manufacture of plywood panels or continous veneer panels by projecting presized and preglued sheet plies off a conveyor and down against a fence. When hitting the fence, the sheet plies fall by gravity over the preceding sheet. When falling, lateral movement of the sheet can occur and the falling sheet does not necessarily land exactly at a predetermined location over the preceding sheet. The result is a continuous veneer panel with uneven edges. To obtain a good quality final product, the uneven edges have to be sawn off resulting in waste and increasing the cost of the operation. Furthermore, the speed of such apparatus is limited by physical constraints.

For example, if plies are sent off the conveyor too quickly, the plies will tend to bounce off the fence in erratic fashion. Such systems are used to create veneer panels consisting of multiple plies and lengths of veneer, the resulting panels are often plagued by inconsistent joints between lengths of veneer and excessive waste due to misaligned plies of veneer. Finally, prior art systems are rather bulky, complex, and take up large amounts of factory floor space.

It is also noteworthy that pressing and gluing equipment manufacturers have made recent advances in glue compositions and pressing equipment which allow faster setting and pressing of panels.

Thus, it would clearly be advantageous to provide an apparatus which affords higher laying up speed and greater accuracy in constructing multiple layer panels.

One object of the present invention is to provide a faster lay up apparatus capable of feeding the larger and faster presses that are now available on the market.

Another object is to provide a lay up apparatus which is more accurate, so as to minimize waste edges and to provide longitudinal joints which consistently meet required specifications.

A further object is to provide a relatively compact apparatus so as to free up factory floor space and optimize factory layout.

A still further object is to provide a versatile and easily configured apparatus capable of being quickly and easily installed in existing or new factories.

To summarize, the main object of the present invention is to provide an apparatus superior to prior art apparatus in a number of ways including speed, precision and simplicity. The primary object being to lay a larger amount of veneer sheets by unit of time and to lay these sheets, one over the other, with greater accuracy, whereby the edges of the sheet being laid are even with the edges of the sheet it is being laid on. This reduces waste by reducing the width of the edgings. Higher speeds means increased productivity and less waste means higher yield. Increased productivity and higher yield are synonymous of increased profits.

SUMMARY OF THE INVENTION

Generally speaking, the present invention provides an apparatus for automatically laying up continuous veneer panels having a plurality of stacked sheets, each sheet having a top face, a bottom face, a transverse axis, longitudinal edges and, back and front transverse edges, said sheet being optionally preglued on its top face, said apparatus comprising:

a frame;

a conveyor assembly for receiving the veneer sheets for successively feeding said veneer sheets in a timed manner and in a direction substantially parallel to said transverse axis, said conveyor assembly being mounted to said frame and comprising a plurality of spaced apart, essentially parallel, and synchronized conveyor members, at least two of said conveyor members having lug members for pushing against the back transverse edge of each of said sheets, thereby urging said sheets forward, an alignment device, also mounted to said frame, for contacting each said longitudinal edges of said sheet wherein alignment of said transverse axis of said sheet is obtained;

a track assembly, also mounted to said frame, for guiding the path of said conveyor assembly in a first substantially horizontal portion, a second upward trajectory portion, a third substantially inverted portion and a fourth return portion;

vacuum hood members mounted behind and between said upward portion of said conveyor members, for maintaining and urging said sheets against said conveyor members during the movement of said sheets along the upward trajectory portion of said conveyor members by creating a suction on the back face of said sheets, said vacuum hood members being connected to a vacuum source;

a suction box member movably mounted to said frame and having suction feet having a sole plate provided with a plurality of apertures, said suction feet substantially straddling said inverted portion of said conveyor members, said suction box being connected to a vacuum source for creating suction, through said sole plate of said suction feet, on the back face of said sheets and maintaining each said sheets in a substantially inverted position with its top, optionally glue bearing face, facing downwards relative to its initial orientation upon entering said conveyor assembly and its back face held against said suction feet, said suction box being movably mounted on said frame and comprising:

at least one piston member adapted for substantially vertical movement of said suction box in a downward stroke and upward stroke, said piston member being controllable for controlling the length of said downward and upward strokes;

a valve member for sequentially discontinuing and reactivating said vacuum source;

a discharge conveyor assembly, mounted to said frame, for receiving said sheets laid up thereon by said suction box on its downward stroke, and said discharge conveyor assembly being adapted for sequential advancement and retraction allowing the transport and construction of a veneer panel in accordance with a predetermined order.

In a preferred embodiment, the apparatus of the present invention further comprises a computer unit for directing and monitoring each sequence of the laying up operation.

In a still preferred embodiment, the track assembly has a side elevation profile substantially generally in the shape of the letter U laid on its left side. Optionally, the track assembly could be in the shape of a cylinder laid on its side, with at least one side open, with the veneer sheets being fed in from the opening and traveling along the inside circumference of the cylinder.

One advantage of the present invention is the use of vacuum as a means to hold each veneer sheet firmly, reducing if not entirely eliminating the possibility of lateral movement, while each sheet is being turned upside down (glue side down) and pressed one over the other.

A related advantage of the apparatus of the present invention is its versatility. Veneer sheets can be fed from one, two or all of the three infeed systems that can be connected to it. The apparatus can produce a continuous multiple layer veneer panel or a series of plywood panels of length equal to the length of the sheet plies being used. Furthermore, the apparatus can simultaneously handle different sizes of sheets, such as full sheets, half sheets and part sheets.

An important advantage is being able to feed the apparatus from more than one direction. This provides excellent versatility and adaptability for installation in existing factories. Furthermore, the apparatus can be outfed in at least two different ways which makes it even more adaptable to existing factories. Indeed, many infeed and outfeed combinations are possible as will be appreciated by those skilled in the art.

Another related feature of the apparatus of the present invention is its simplicity. Simplicity equates to less parts, maintenance, repair, and downtime which all translate into increased productivity. A still further advantage of the apparatus is its compactness. The apparatus is generally small enough to be assembled and operated in the manufacturer's plant, shipped in smaller assemblies and quickly re-assembled in the client's factory thereby reducing down time to a minimum. The apparatus requires little floor space and can then be installed economically in existing or new factories.

These and other related objects and advantages of this invention will become apparent as the following description is read in conjunction with the drawings.

BRIEF DESCRIPTION OF THE DRAWINGS

FIG. 5 is a schematic view of the construction of a continuous veneer panel showing the arrangement of multiple veneer sheets;

FIG. 6 is a schematic view of an optional embodiment of the present invention, the embodiment having double superimposed discharge conveyors;

FIG. 7 is a sectional and front elevation view of an optional embodiment of the present invention, the embodiment having serially disposed sheet positioning members;

FIG. 8 is a schematic view showing various possible arrangements for infeeds and outfeeds of the apparatus of the present invention.

DETAILED DESCRIPTION OF PREFERRED EMBODIMENTS

Figure 1:
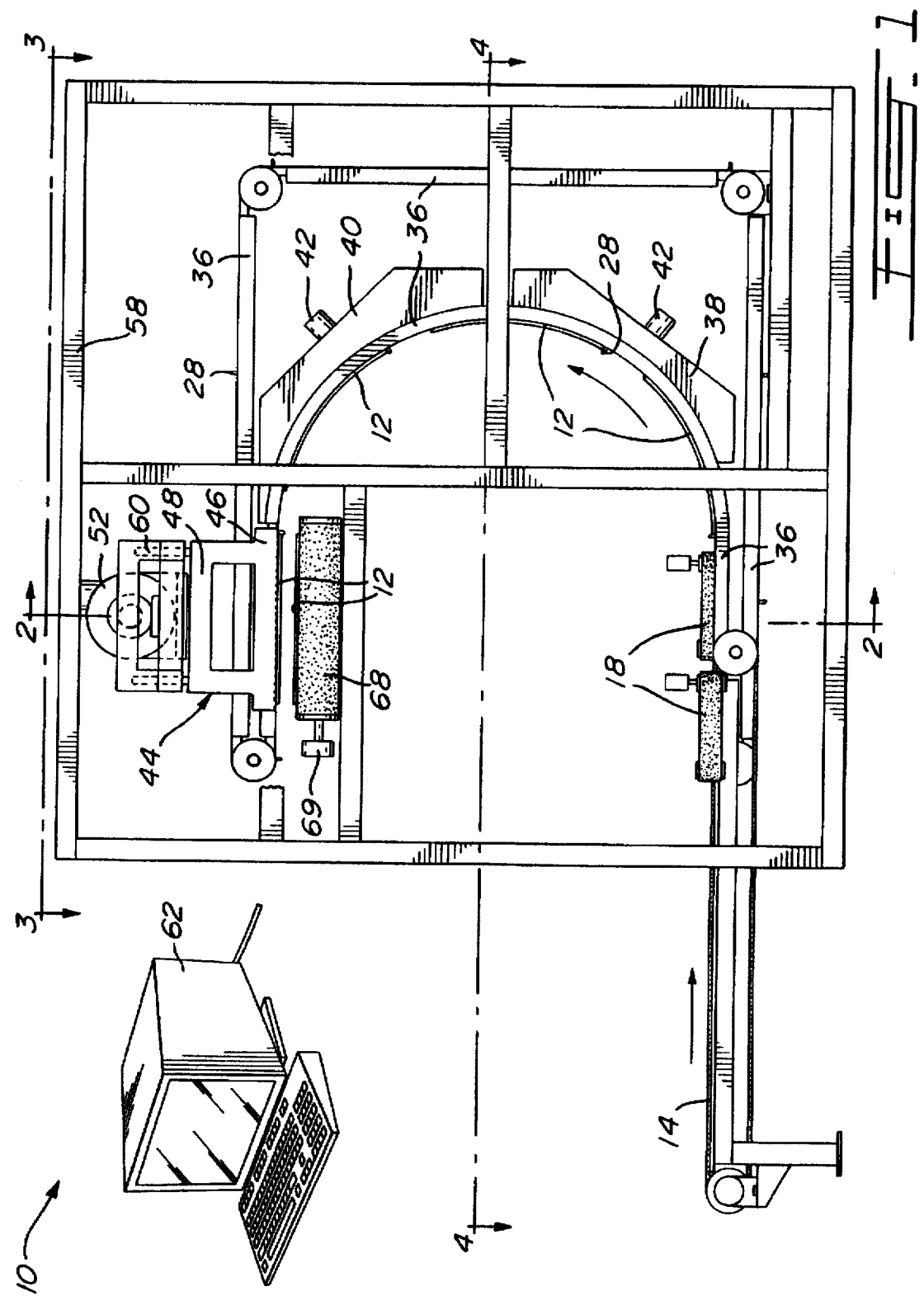
FIG. 1 is a side elevation view of the apparatus of the present invention.

Referring now in detail to the drawings, there is shown in FIG. 1 a lay up apparatus for the construction of continuous veneer panels composed of multiple lengths and layers of veneer sheets, glued and pressed together in a monolithic panel. The apparatus is generally designated by the arrow 10. Veneer sheets 12 (shown in dotted lines on subsequent figures) move along a predetermined cycle terminating with the precise positioning and tack pressing of sheets 12 against previously positioned sheets. Apparatus 10 will now be described in conjunction with the cycle of sheets 12.

Veneer sheets 12 are horizontally and transversely fed to apparatus 10 by traveling on infeed conveyor 14. Advantageously, infeed conveyor will consist of a plurality of parallel and spaced apart belts 16, as shown on FIGS. 3 and 4, and will be driven by a common axle rotated by a variable speed motor 20 through an appropriate reduction gear box.

It is to be understood that veneer sheets 12 are fed one at a time in accordance with a predetermined order for their assembly as a continuous panel as shown in FIG. 5. With the exception of the base layer, the veneer sheets 12 are fed via infeed conveyor 14 with glue previously applied to their top face.

Veneer sheets 12 traveling on infeed conveyor 14 are aligned by their longitudinal edges 22 when contacting alignment belts 18 or other similar devices easily known to those skilled in the art. Belts 18 are mounted upright and at an angle to center the sheets 12 on infeed conveyor 14.

Figure 2:
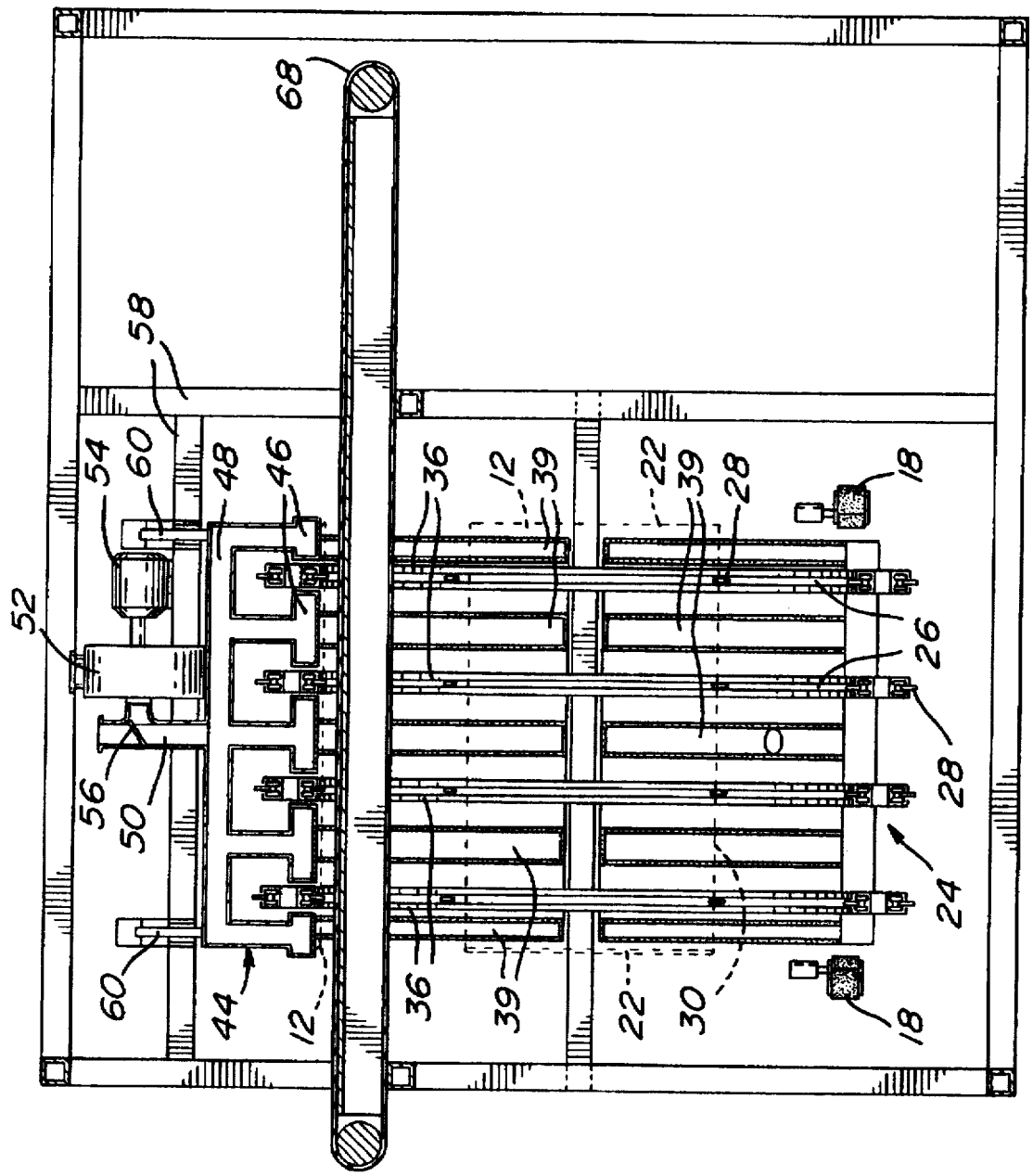
FIG. 2 is a sectional and front elevation view taken generally along line 2—2 in FIG. 1.

Referring now to FIG. 2, veneer sheets 12 continue their transverse progress by transferring onto alignment conveyor 24 having endless chains 26, mounted between the individual belts 16. Each chain 26 having a plurality of evenly spaced and outwardly projecting lugs 28, with each lug transversely aligned with a lug of the adjacent chain for aligning the back edge 30 of each sheet 12. Chains 26 are driven by a common drive shaft 32 itself driven by a variable speed motor 34 through an appropriate reduction gear box. Thus, the speed of infeed conveyor 14 and alignment conveyor 24 can be synchronized.

Chains 26 follow a U-shaped path in channel tracks 36 with the lugs 28 urging the sheets forward by abutting against their back edge 30. Referring again to FIG. 1, sheets 12 transversely advance along the U-shaped path and are prevented from falling by gravity by vacuum hoods 38 and 40 mounted immediately behind tracks 36 and chains 26. Vacuum hoods 38 and 40 have generally rectangular suction nozzles 39 mounted between each of said tracks 36. Advantageously, the suction nozzles 39 will be provided with rubber edges for smoothly contacting the back of sheets 12. In practice, it is expected that sheets 12 will slightly bend to conform to the curvature of tracks 36. Thus, sheets 12 are effectively flipped glue side down without falling and without longitudinal displacement.

Vacuum hoods 38 and 40 are provided with vacuum ports 42 connected to a variable speed blower (not shown) allowing control over the degree of vacuum applied to sheets 12.

Alignment conveyor 24 urges sheets 12 forward until positioned under suction-lift box 44 where the sheets are held by vacuum. As seen in FIG. 2, suction-lift box 44 comprises a plurality of longitudinal rectangular feet 46 positioned between chains 26 and provided with a plurality of apertures (not shown) for effecting a suctional lift on sheets 12. Suction-lift box 44 is sized to cover much of the area of the largest veneer sheet 12 susceptible of being handled by apparatus 10. Feet 46 are interconnected at plenum 48, itself connected via duct 50 to a blower 52 driven by motor 54. Duct 50 is also provided with a quick-action valve 56 to selectively discontinue all vacuum from feet 46 so as to release sheet 12 at the end of the cycle. Also, suction-lift box 44 is movably mounted to framework 58 so as to be capable of precise up and down movement.

Figure 3:
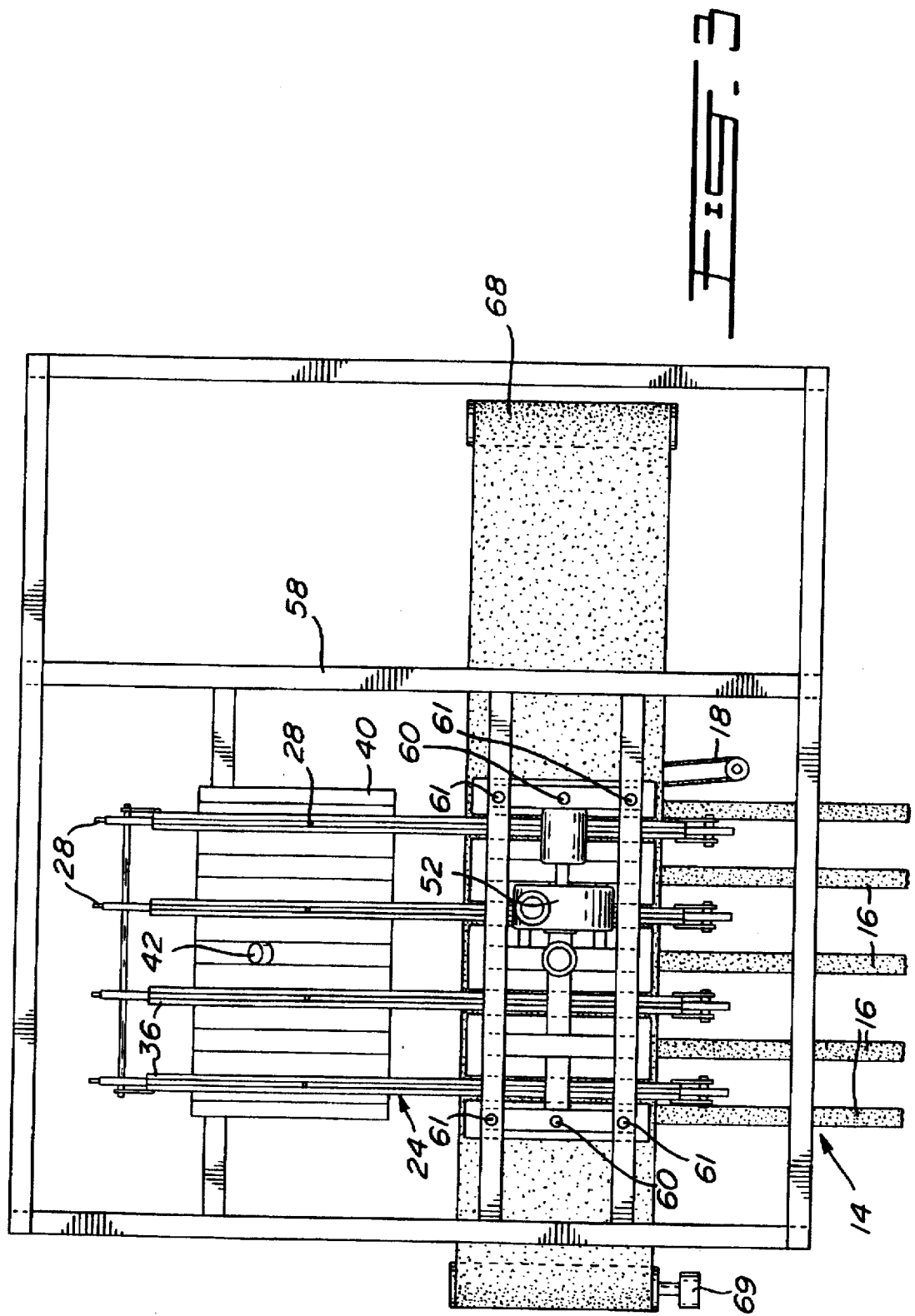
FIG. 3 is a top view taken generally along line 3—3 in FIG. 1.
Figure 4:
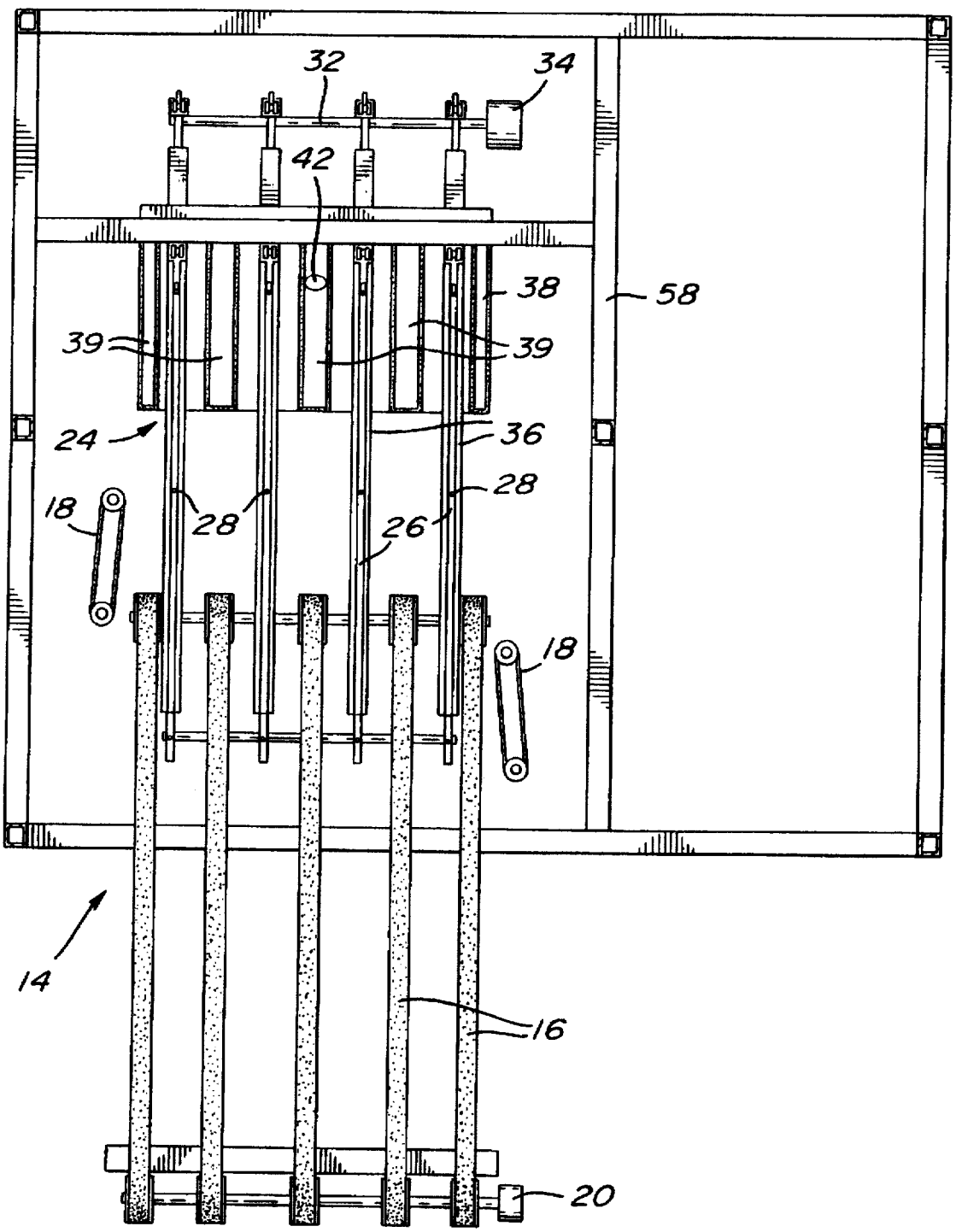
FIG. 4 is a sectional view taken generally along line 4—4 in FIG. 1.

Referring to FIGS. 2, 3 and 5, the movement of suction-lift box 44 is advantageously controlled by a pair of hydraulic linear positioning cylinders 60 or similar piston-like mechanisms easily determined by those skilled in the art. The up and down movement of suction box 44 is also guided by sliding guides 61. Cylinders 60 are directed by a computer 62, appropriately interfaced to cause cylinders 60 to adjust their stroke 64, in unison, in accordance with the thickness of the veneer panel 66 being constructed. Accordingly, sheets 12 are precisely lowered into position, glue face down, towards previously positioned sheets 12, on discharge conveyor 68. Advantageously, the downward stroke of suction-lift box 44 also presses down sheet 12 so as to permit a tack bond of the glue. Also advantageously, sheets 12 are provided with chamfered longitudinal edges 70 for precise fit and improved structural strength of the resulting panel 66. However, it is common in the art to provide straight-edged sheets 72 for the core position and to leave a slight gap 74 between those core sheets 72 to let steam or other gases escape during a subsequent hot-pressing step (not described and not part of the present invention).

The cycle is completed by discontinuing vacuum in suction-lift box 44 to release sheet 12. Suction-lift box 44 powered by cylinders 60 is returned to its retracted position, vacuum is re-established and box 44 is ready to receive the next sheet 12. Meanwhile, discharge conveyor 68 is advanced, towards the right on FIG. 5, by a predetermined distance 76 corresponding to a staircase-like assembly of continuous veneer panel 66. In this preferred embodiment, discharge conveyor 68 consists of a flat belt and is provided with a precise advancement mechanism 69 provided with a variable speed motor and an appropriate reduction gear box, or similar equipment. Mechanism 69 is also controllable via a proper interface by computer 62. Furthermore, it is to be understood that infeed conveyor 14 and alignment conveyor 24 are also advantageously controlled by computer 62 so as to render the entire cycle capable of being fully automated.

It is also to be understood that the above described equipment is equipped, wherever required, with detection devices such as photocells, limit and proximity switches and other control devices such as pulse encoders. These devices are wired to programmable components such as programmable logic controllers, microprocessors and computer 62. Computer 62 is provided with appropriate software to conduct the orderly assembly of veneer panel 66. It is also to be understood that the circuits controlling the various component units of the present invention are connected to each other in a feed back relationship so that one unit does not start its cycle of operation until the previous unit has reached a certain stage in its cycle of operation.

The above described cycle is repeated until a full stack of sheets 12 corresponding to the desired thickness of veneer panel 66 is achieved. Then discharge conveyor 68 will be backed up, right to left on FIG. 5, by a distance 78 so as to allow the positioning of a new base sheet adjacent to base sheet 80. Of course, as indicated before, base sheets are not covered with glue so as to avoid sticking to discharge conveyor 68.

Of course, the size, material and thickness of each sheet 12 is not important as the apparatus 10 can be programmed to construct a continuous panel 66 according to chosen specifications. Obviously, the downward stroke of suction box 44 is gradually adjusted in accordance with the current thickness 82 of the stack being built into a continuous veneer panel.

The invention will now be further illustrated by describing optional embodiments for obtaining a greater throughput of veneer panels 66.

Referring to FIG. 6 there is shown an optional embodiment of the present invention where a pair of similar apparatus 10 and 10' are positioned in series. Such arrangement makes it possible to receive two series of veneer sheets traveling on parallel infeed conveyors and in a common direction. Apparatus 10 is raised relative to apparatus 10'. Thus, it is possible to extend discharge conveyor 68' through apparatus 10 and provide a double discharge from superimposed conveyors 68 and 68'. This allows a pair of panels 66 to be simultaneously assembled and fed by conveyors 68 and 68' to a conventional dual-opening prepress or hot press.

Referring now to FIG. 7, there is shown an optional embodiment of the apparatus of the present invention, this time provided with a pair of assemblies 78 and 78', mounted in parallel relationship. A single discharge conveyor runs below suction-lift boxes 44 and 44'. Thus, the throughput speed of construction of veneer panel 66 can be essentially doubled with both assemblies 78 and 78' working in sequence or in unison to build panel 66.

Referring now to FIG. 8, it is noteworthy to mention that apparatus 10 is very versatile in its infeed and discharge configurations. For example, infeed of sheets 12 can be done from three sides while discharge can be to the left or right. This of course has tremendous advantages when adapting such equipment to existing factory or when designing a new factory floor layout. Furthermore, the apparatus of the present invention is quite compact and can be easily built by modules, tested, disassembled and shipped to the customer for rapid assembly and minimal downtime.

Although the invention has been described above with respect with one specific form, it will be evident to a person skilled in the art that it may be modified and refined in various ways. It is therefore wished to have it understood that the present invention should not be limited in scope, except by the terms of the following claims.

What is claimed:

1. Apparatus for automatically laying up veneer sheets for the manufacture of continuous veneer panels composed of a plurality of stacked veneer sheets, each sheet having a top face, a bottom face, a transverse axis, longitudinal edges and, back and front transverse edges, said sheet being optionally preglued on its top face, said apparatus comprising:

a frame;

a conveyor assembly for receiving the veneer sheets for successively feeding said veneer sheets in a timed manner and in a direction substantially parallel to said transverse axis, said conveyor assembly being mounted to said frame and comprising a plurality of spaced apart, essentially parallel, and synchronized conveyor members, at least two of said conveyor members having lug members for pushing against the back transverse edge of each of said sheets, thereby urging said sheets forward, an alignment device, also mounted to said frame, for contacting each said longitudinal edges of said sheet wherein alignment of said transverse axis of said sheet is obtained;

a track assembly, also mounted to said frame, for guiding the path of said conveyor assembly in a first substantially horizontal portion, a second upward trajectory portion and a third substantially inverted portion;

vacuum hood members mounted behind and between said upward portion of said conveyor members, for maintaining and urging said sheets against said conveyor members during the movement of said sheets along the upward trajectory portion of said conveyor members by creating a suction on the back face of said sheets, said vacuum hood members being connected to a vacuum source;

a suction box member movably mounted to said frame and having suction feet having a sole plate provided with a plurality of apertures, said suction feet substantially straddling said inverted portion of said conveyor members, said suction box being connected to a vacuum source for creating suction, through said sole plate of said suction feet, on the back face of said sheets and maintaining each said sheet in a substantially inverted position with its top, optionally glue bearing face, facing downwards relative to its initial orientation upon entering said conveyor assembly and its back face held against said suction feet, said suction box being movably mounted on said frame and comprising:

at least one piston member adapted for substantially vertical movement of said suction box in a downward stroke and upward stroke, said piston member being controllable for controlling the length of said downward and upward strokes;

a valve member for sequentially discontinuing and reactivating said vacuum source;

a discharge conveyor assembly, mounted to said frame, for receiving said sheets laid up thereon by said suction box on its down stroke, and said discharge conveyor assembly being adapted for sequential advancement and retraction allowing the transport and construction of a veneer panel in accordance with a predetermined order.

2. The apparatus of claim 1 further comprising a computer unit for directing and monitoring each sequence of the laying up operation.

3. The apparatus of claim 1 wherein said track assembly has a side elevation profile generally in the shape of the letter U laid on its left side.

4. The apparatus of claim 1 wherein said conveyor assembly comprises a first infeed conveyor feeding a second conveyor, said second conveyor having a plurality of spaced apart parallel conveyor members having lug members outwardly projecting therefrom.

5. The apparatus of claim 4 wherein said second conveyor consists of a plurality of parallel, spaced apart, endless chains driven by a common axle.

6. The apparatus of claim 5, wherein said first conveyor consists of a plurality of parallel, spaced apart, belt members driven by a common axle.

7. The apparatus of claim 6, wherein said endless chains are each guided by channel-shaped tracks each having a side elevation profile substantially generally in the shape of the letter U laid on its left side.

8. The apparatus of claim 7 wherein said discharge conveyor is a belt conveyor.

9. The apparatus of claim 8 wherein said alignment comprises at least one pair of alignment belts, at least one alignment belt being mounted vertically on each side of said conveyor assembly and being flared outwardly to receive the longitudinal edges of said sheet and urging said sheet in a predetermined alignment position relative to said conveyor assembly.

10. The apparatus of claim 1 wherein said track assembly is generally in the shape of a cylinder laid on its side.

11. The apparatus of claim 1 wherein said piston member adapted for substantially vertical movement of said suction box comprises a pair of spaced apart hydraulic piston and at least one pair of slide guides for guiding the vertical movement of said suction box.

* * * * *